US012455958B1

United States Patent
Karthik et al.

(10) Patent No.: US 12,455,958 B1
(45) Date of Patent: Oct. 28, 2025

(54) METHODS AND APPARATUS FOR ENHANCING SECURITY IN THE ORCHESTRATION PLATFORM

(71) Applicant: Dell Products L.P., Round Rock, TX (US)

(72) Inventors: Rajini Ramachandran Karthik, Austin, TX (US); Muzhar S. Khokhar, Shrewsbury, MA (US); Eric Randal Young, Alexandria, VA (US); Puneeth Chowdary Kosaraju, Melissa, TX (US); Shashank Holakkal, Justin, TX (US); Qi Jin, West Newton, MA (US); Yi Fang, Sharon, MA (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 18/647,280

(22) Filed: Apr. 26, 2024

(51) Int. Cl.
*G06F 21/54* (2013.01)
*G06F 9/48* (2006.01)
*G06F 21/55* (2013.01)
*G06F 21/60* (2013.01)
*H04L 9/40* (2022.01)

(52) U.S. Cl.
CPC ............ *G06F 21/54* (2013.01); *G06F 9/48* (2013.01); *G06F 21/552* (2013.01); *G06F 21/604* (2013.01); *H04L 63/102* (2013.01)

(58) Field of Classification Search
CPC .......... G06F 21/54; G06F 9/48; G06F 21/552; G06F 21/604; H04L 63/102
See application file for complete search history.

(56) References Cited

U.S. PATENT DOCUMENTS

| | | |
|---|---|---|
| 9,021,550 B2 * | 4/2015 | Rits .................. G06F 21/60 726/2 |
| 10,477,070 B2 | 11/2019 | Watts et al. |
| 11,144,363 B1 * | 10/2021 | Francis Conde ..... G06F 9/4843 |
| 11,308,035 B2 | 4/2022 | Prahlad et al. |
| 11,463,444 B2 | 10/2022 | Stephens et al. |
| 11,609,811 B2 | 3/2023 | Ramanujan et al. |
| 11,714,568 B2 | 8/2023 | Kilaru et al. |
| 11,740,943 B2 | 8/2023 | Vassenkov et al. |
| 11,849,023 B2 | 12/2023 | Castellucci et al. |
| 12,003,655 B1 * | 6/2024 | Slaughter .............. H04L 9/14 |
| 2010/0011361 A1 * | 1/2010 | Millmore ........... G06F 21/6218 718/100 |
| 2016/0182487 A1 * | 6/2016 | Zhu ..................... H04L 63/083 726/9 |
| 2020/0019561 A1 | 1/2020 | Doyle |
| 2023/0009739 A1 | 1/2023 | Ponnuswamy et al. |

(Continued)

*Primary Examiner* — Ramy M Osman
(74) *Attorney, Agent, or Firm* — WOMBLE BOND DICKINSON (US) LLP (57) ABSTRACT

Methods and systems for managing operation of infrastructure are disclosed. The operation of the infrastructure may be managed by limiting activity that may be performed by the infrastructure. The activity may be limited by restricting tasks that may be added to queues of tasks that the infrastructure is authorized to perform. The content of the queues may be limited during workflow selection, task identified for workflows, and service registration for servicing the queues. The content may be limited using a combination of registration requirements, role based restrictions, and token requirements.

20 Claims, 6 Drawing Sheets

(56) References Cited

U.S. PATENT DOCUMENTS

| | | | |
|---|---|---|---|
| 2023/0086609 A1* | 3/2023 | Grenet | G06N 20/00 |
| | | | 700/19 |
| 2023/0252168 A1 | 8/2023 | Savir et al. | |
| 2023/0289209 A1* | 9/2023 | Padmanabhan | G06F 9/5038 |
| 2023/0342684 A1 | 10/2023 | Cella et al. | |
| 2023/0353575 A1* | 11/2023 | Chandra | H04L 63/08 |
| 2024/0311179 A1* | 9/2024 | Wen | G06F 9/4881 |
| 2024/0380748 A1* | 11/2024 | Yao | G06F 21/41 |

\* cited by examiner

METHODS AND APPARATUS FOR ENHANCING SECURITY IN THE ORCHESTRATION PLATFORM

FIELD

Embodiments disclosed herein relate generally to device management. More particularly, embodiments disclosed herein relate to systems and methods to onboard devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, various endpoint devices of infrastructure may perform various actions and communicate with one another. Such communications and actions may serve as a vector of attack on the endpoint devices.

To reduce the likelihood of the attacks being successful, a system in accordance with an embodiment may utilize a security framework for verifying integrity of communications and authority of entities for requesting various actions via the communications. The framework may utilize security tokens, registration requirements, role based access control systems, and task queues to limit the activity of endpoint devices to only those activities that can be verified.

By doing so, infrastructure may be less likely to be compromised while cooperatively working to provide desired computer implemented services. Thus, embodiments disclosed here may address, in addition to others, the technical problem of security in a distributed system where the security of any of the components of the distributed system may be compromised thereby providing for avenue so attack on other components of the infrastructure.

In an embodiment, a method for managing a system that provides computer implemented services is disclosed. The method may include obtaining, by an infrastructure component, a request to provide a new computer implemented service; registering a worker service hosted by the infrastructure component with a workflow service hosted by an infrastructure management system to obtain a registered worker service; obtaining, by the infrastructure component and from a security service, a security token for the new computer implemented service; attempting, by the infrastructure component and using the security token, to register a workflow for the new computer implemented service with the workflow service; in a first instance of the attempting to register the workflow where the workflow is successfully registered: adding, by the workflow service, at least one task based on the workflow to a queue associated with the registered worker service to obtain an updated queue; and performing, by the registered worker service, the at least one task using the updated queue to facilitate provisioning of the new computer implemented service.

Registering the worker service may include associating, with the workflow service, the workflow with the queue to establish an association.

Adding the at least one task may include identifying, using the association, that the workflow is associated with the queue; and selecting, based on the identifying, the queue for population with the at least one task.

Attempting to register the workflow may include sending, by the infrastructure component and to the workflow service, a request to register the workflow and the security token; attempting, by the workflow service and using the security token, to verify that the workflow is authorized; in a first instance of the attempting to verify that the workflow is authorized where the workflow is successfully verified as being authorized: authorizing addition of the at least one task to the queue; and in a second instance of the attempting to verify that the workflow is authorized where the workflow is not successfully verified as being authorized: denying addition of the at least one task to the queue.

The registered worker service may be adapted to monitor the queue for tasks and perform identified tasks from the queue.

The security service may provide role based access control services, and the security token may be adapted based on the role based access control services.

The method may also include in a second instance of the attempting to register the workflow where the workflow is not registered: refusing, by the workflow service, addition of any asks task based on the workflow to the queue to prevent the new computer implemented services from being provided.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Figure 1:
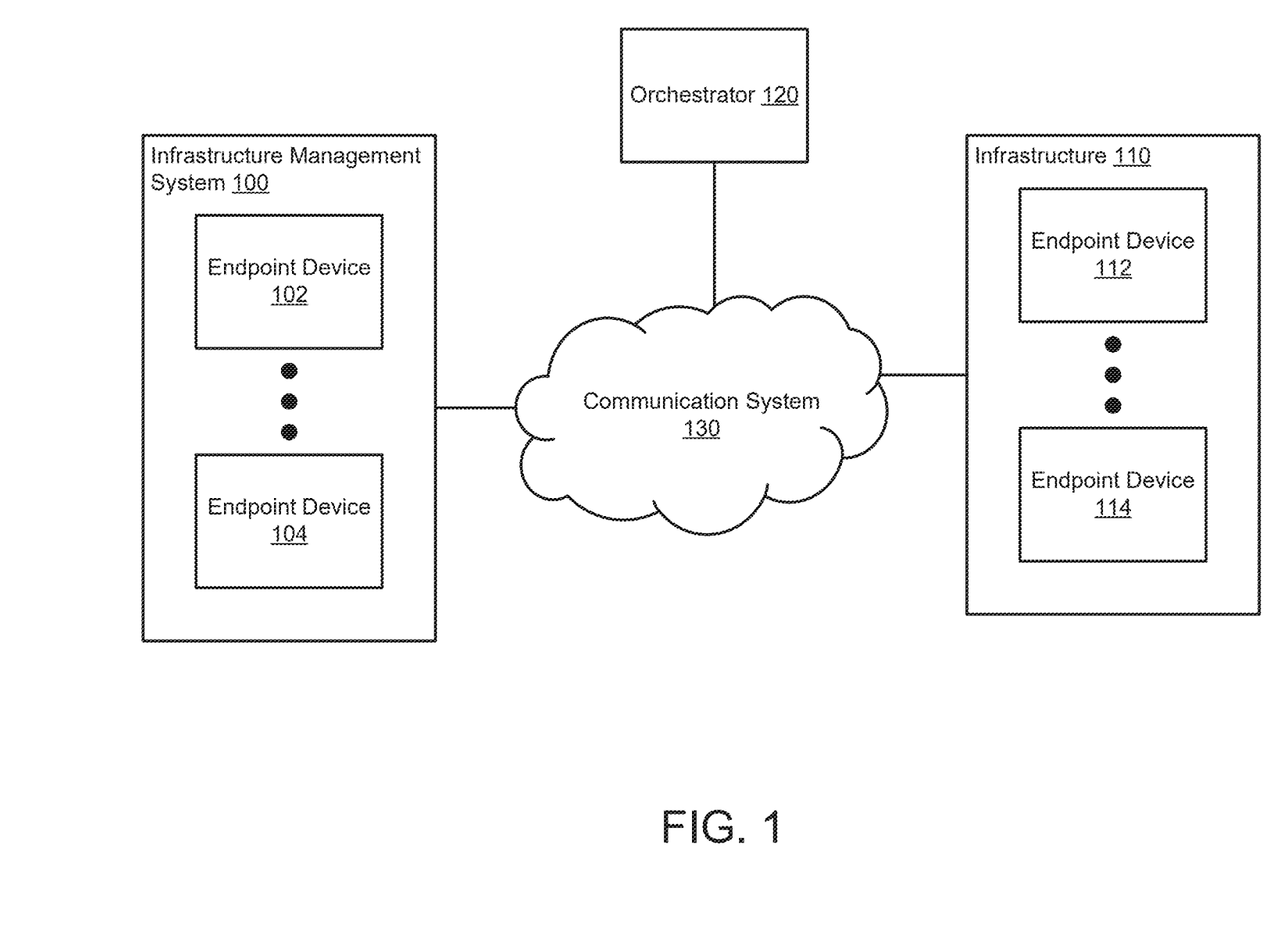
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include various distributed components. The components may cooperate to provide the computer implemented services.

To cooperate, the components may send message to one another. The messages may include information regarding actions to be performed, information used in performing actions, and/or other types of information.

However, malicious entities may attempt to compromise various components of the distributed system by sending various messages. The messages may appear to be from legitimate sources. Consequently, the components of the distributed system may act on these messages. Such actions may result in the computer implemented services provided by the system to be compromised, the components themselves being compromised, and/or other components that interact with the system being compromised.

In general, embodiments disclosed herein may provide methods, systems, and/or devices for managing the operation of distributed infrastructure to provide computer implemented services. To manage the distributed infrastructure, a framework may be enforced across the distributed infrastructure. The framework may require instructions used by the system to be verified prior to performance, components of the distributed infrastructure to be registered, and/or other actions to be performed to limit the ability of malicious entities to compromise the distributed infrastructure.

To provide the above noted functionality, the system of FIG. 1 may include infrastructure management system 100, infrastructure 110, orchestrator 120, and communication system 130. Each of these components is discussed below.

Infrastructure 110 may provide desired computer implemented services. To do so, infrastructure 110 may include any number of endpoint devices (e.g., 112-114) that may cooperatively and/or independently provide the computer implemented services. The endpoint devices may host various software (e.g., executing services) that may (i) enable users and/or other entities to request that various services be performed, and (ii) cooperate with infrastructure management system 100 and/or orchestrator 120 to authorize and queue performance of actions so that the requested services are provided. For example, infrastructure 110 may host various worker instances (e.g., executing processes) that may perform tasks queued by infrastructure management system 100. To prevent unauthorized tasks from being performed, only queue tasks may be performed.

Infrastructure management system 100 may cooperatively manage infrastructure 110 with orchestrator 120. To do so, infrastructure management system 100 may (i) require that infrastructure 110 (and components/software thereof) register with it, (ii) obtain workflow performance requests for computer implemented services to be provided by infrastructure 110, (iii) attempt to verify the workflow performance requests, and (iv) for successfully verified workflow performance requests, add tasks to queues serviced by worker instances hosted by infrastructure 110. By limiting content of the queues, infrastructure management system 100 may limit activity of infrastructure 110.

To provide their functionality, orchestrator 120 and/or infrastructure management system 100 may host various software services such as, for example, security services, workflow services, authorization services, and/or other types of services. The security services and authorization services may (i) utilize role based access controls (RBAC), and (ii) token based verification using the RBACs. These components may be utilized during establishment and management of workflows to ensure that malicious workflows are not performed.

To ensure compliance with the framework, infrastructure 110 may host interception services. The interceptions services may intercept requests for performance of workloads, establishment of additional worker process, and/or other types of requests and automatically apply RBAC and token bases verifications to prevent malicious activity from being performed by infrastructure 110.

Figure 2A:
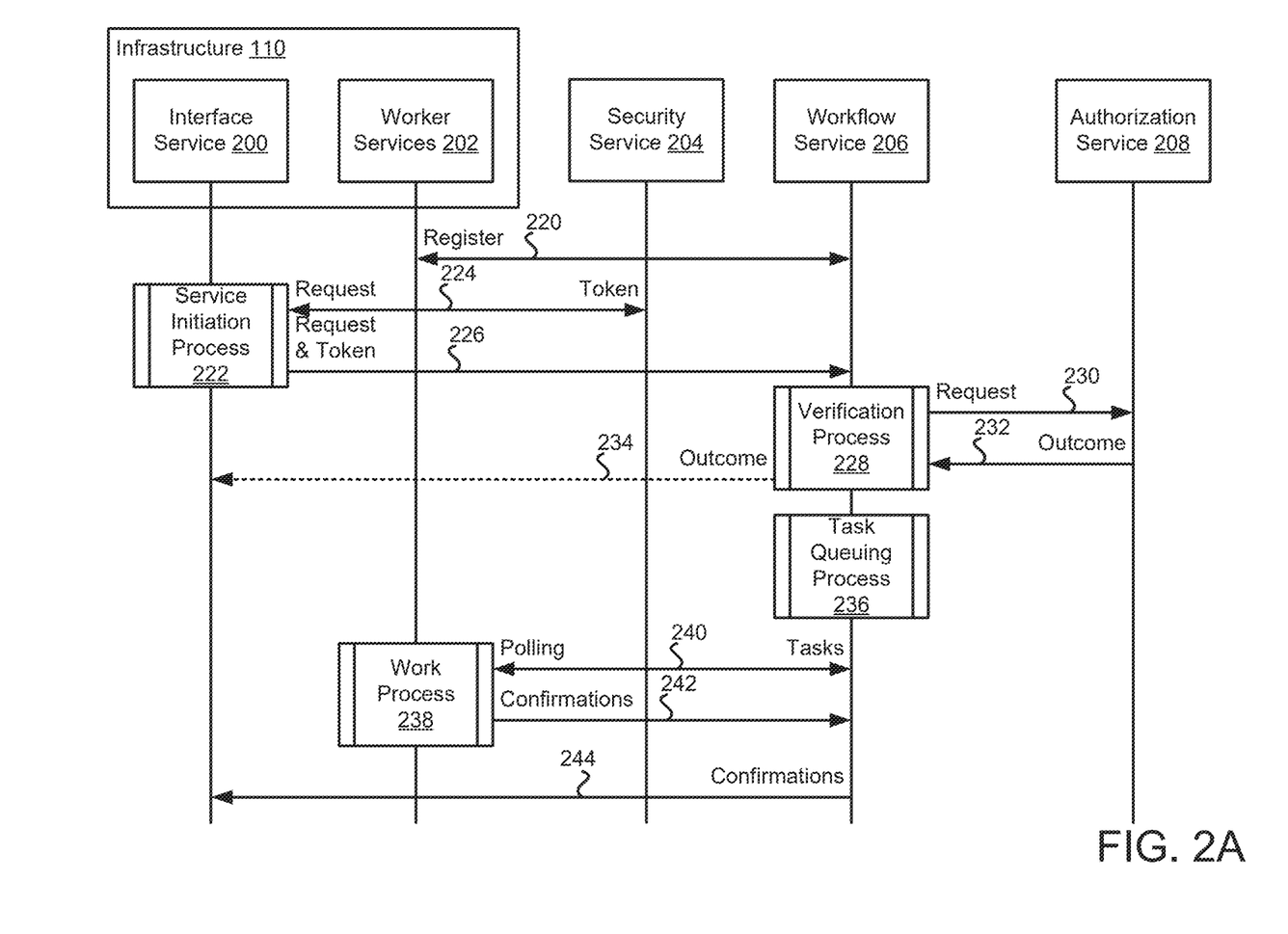
FIGS. 2A-2C shows data flow diagrams illustrating data flows and data processing in accordance with an embodiment.
Figure 2B:
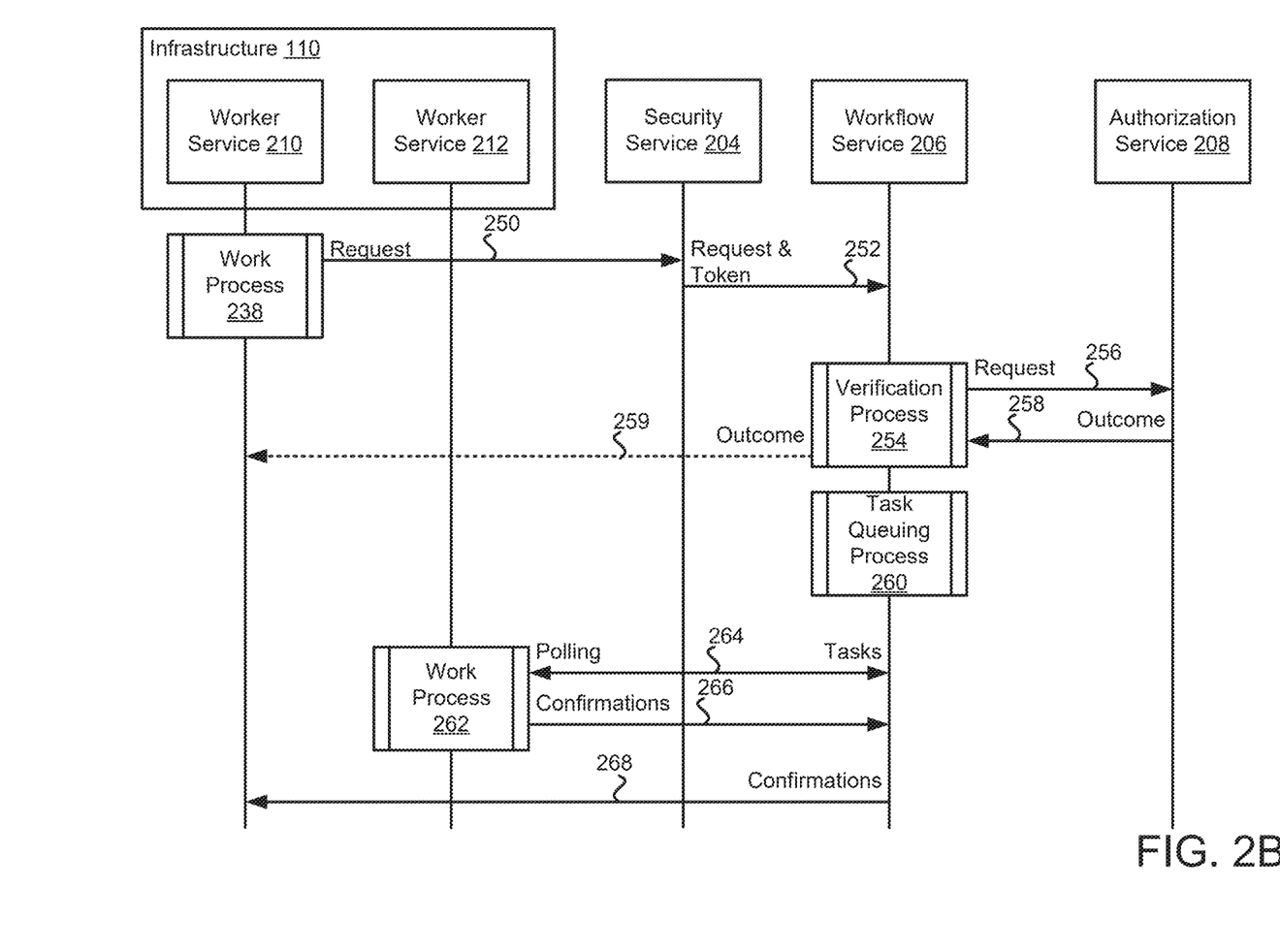
Figure 2C:
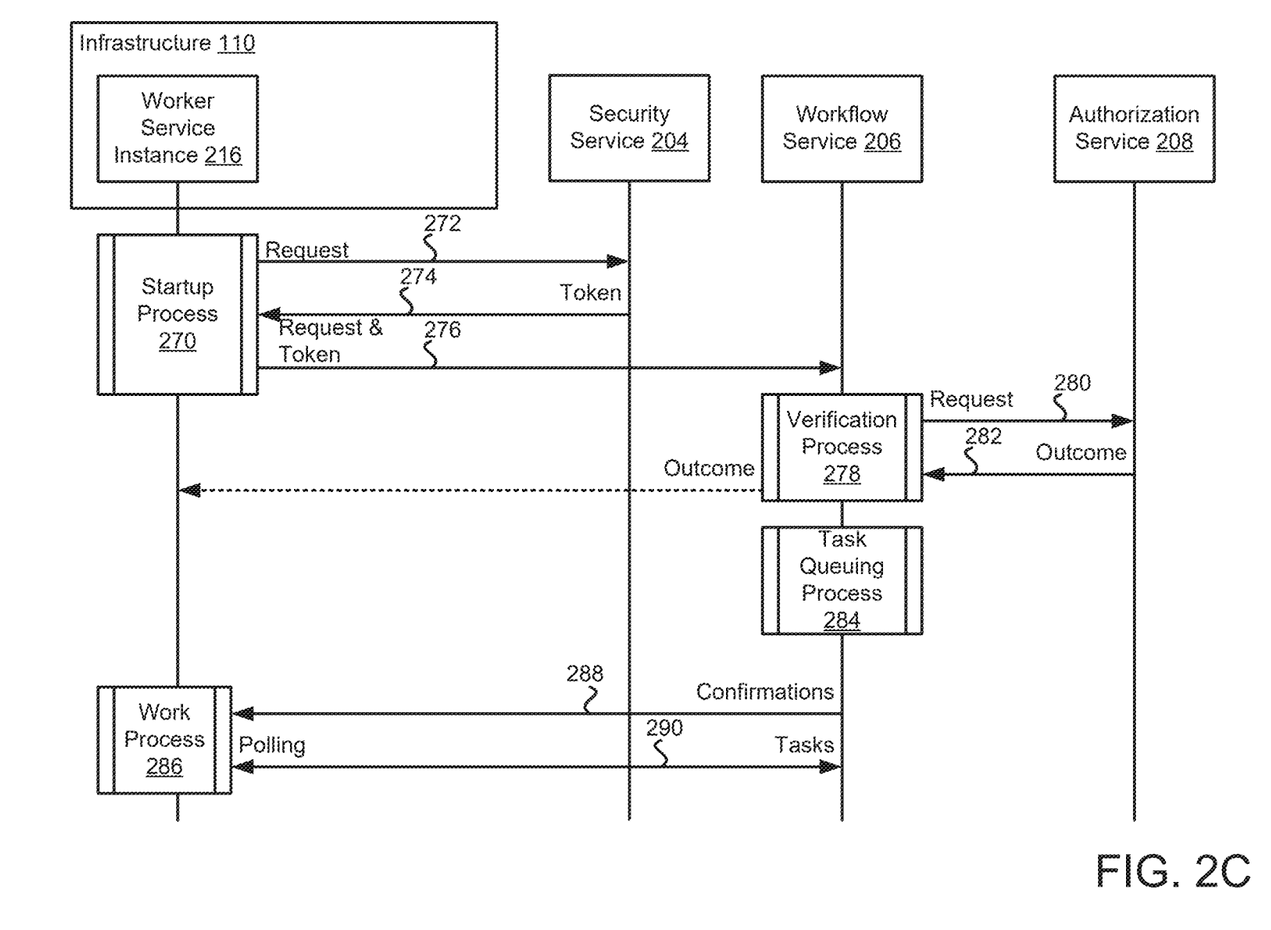
Figure 3:
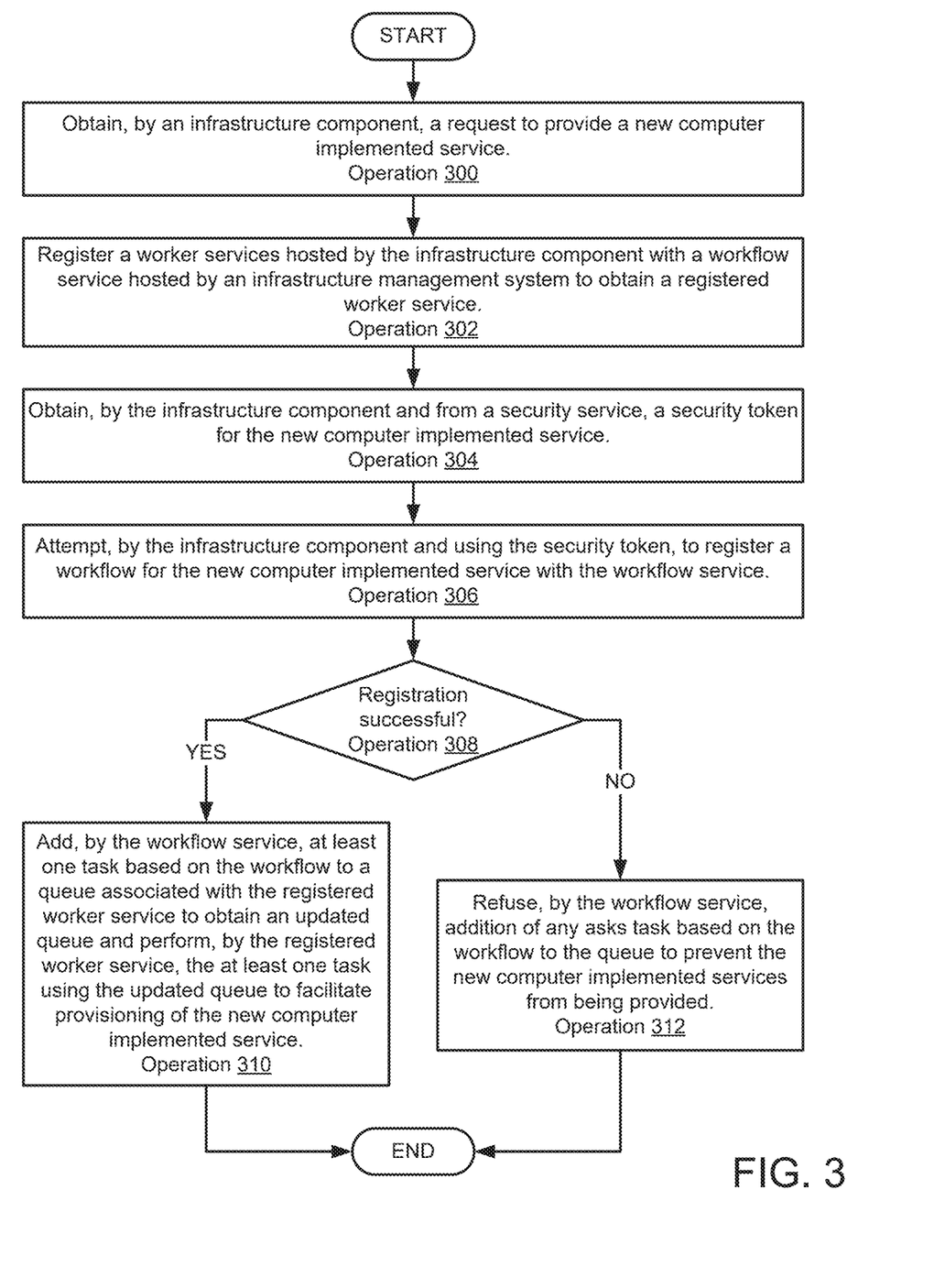
FIG. 3 shows a flow diagram illustrating a method in accordance with an embodiment.

When providing their functionality, any of (and/or components thereof) infrastructure management system 100, infrastructure 110, and/or orchestrator 120 may perform all, or a portion, of the actions and methods illustrated in FIGS. 2A-3.

Any of (and/or components thereof) infrastructure management system 100, infrastructure 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, interactions diagrams in accordance with an embodiment are shown in FIGS. 2A-2C. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 110, 200, etc.), located towards the top of each figure. Lines descend from these shapes. Processes performed by the components of the system are illustrated using a second set of shapes (e.g., 222, 228, etc.) superimposed over these lines. Interactions (e.g., communication, data transmissions, etc.) between the components of the system are illustrated using a third set of shapes (e.g., 224, 226, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 220 may occur prior to the interaction labeled as 226. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during authorization and performance of workflows to provide computer implemented services.

To authorize and perform workflows, at interaction 220, workers services 202 available to perform workflows may register with workflow services 206. Workflow service 206 may manage queues for tasks to be performed by worker services 202. To register, each worker service of worker services 202 may indicate a workflow that is to be performed with a corresponding queue for the tasks that are authorized for performance based on the workflow. During registration, workflow service 206 may verify whether the worker services 202 are trustworthy. If trustworthy (e.g., may be basked on establishing key possession/access), then workflow service 206 may associate the workflow with the corresponding queues (e.g., specified by worker services 202), and may begin populating the queues based on the workflows (e.g., workflows may be converted to tasks using any method, such as having predefined tasks associated with different workflows). Once registered, worker services 202 may poll the queues over time to identify tasks that are authorized by workflow service 206 to perform (e.g., placing a task in a queue servers as an implicit authorization).

The queues may be protected using any method (e.g., encryption, access limits, etc.) so that only the corresponding worker services and workflow services 206 may be ability to utilize the queues.

Once worker services 202 are registered, a new computer implemented services may be requested by a user. For example, interface services 200 (e.g., a user interface) may perform service initiation process 222. During service initiation process 222, infrastructure services 200 may obtain information regarding the new computer implemented service.

Based on the information, at interaction 224, interface service 200 may request a token from security service 204. The token may be a security token usable to demonstrate that the new computer implemented service is within rights of the requestor to obtain. Security service 204 may compare information regarding the user to information from a RBAC system to identify whether the requestor of the service has authority for use of the service. If service is available, then security service 204 may generate and provide the token to interface service 200.

Once obtained, at interaction 226, interface service 200 may request that a workflow for the new computer implemented service be authorized by workflow service 206. The request may include information regarding the workflow and the token obtained at interaction 224.

Based on the request and token, workflow service 206 may perform verification process 228. During verification process 228, workflow service 206 may attempt to verify whether the request should be honored. To do so, at interaction 230, workflow service 206 may send a request to authorization service 208. The request may include the token and/or information regarding the token. Authorization service 208 may use the information to ascertain whether the request from interface service 200 should be honored. Authorization service 208 may do so, for example, by identifying whether the token indicates that the requestor has sufficient privilege for the new computer implemented services. Authorization service 208 may do so by using the token to identify workflow tasks that are authorized based on the token (e.g., may include a database usable to identify relevant workflow tasks). The workflow tasks may be provided to workflow service 206.

Once obtained, workflow service 206 may also provide authorization service 208 with information regarding a target (e.g., worker services to perform the tasks). Authorization service 208 may use that information to identify whether the target is valid (e.g., different worker services may have various predefined limits on tasks that they may perform). If the workflow tasks are within the limits of the target, then authorization service 208 may authorize the workflow. Otherwise, the workflow may be rejected. At interaction 232, authorization service 208 may notify workflow service 206 of the outcome of the analysis.

If negative, workflow service 206 may, at outcome 234, the requestor (e.g., via interface service 200) that the request for the new computer implemented services will not be honored.

If the outcome is positive, task queueing process 236 may be performed. During task queueing process 236, various queues may be populated based on the workflow tasks from authorization service 208. The queues may be selected based on the target. For example, the workflow tasks may be added to queues polled by worker services that were identified as the target.

Once populated and via work process 238, worker services 202 may identify and perform the tasks. For example, at interaction 240 worker services 202 may poll the queues for tasks, pull down new tasks from the queues, and perform the queues. At interaction 242, worker services 202 may send confirmation regarding completed tasks from the queues to workflow service 206.

Once the workflows are complete and/or over time, workflow service 206 may, at interaction 244, send notification to the requestor (e.g., via interface service 200) regarding the status of the workflow through which the new computer implemented services are provided.

Thus, via the flow shown in FIG. 2A, embodiments disclosed herein may facilitate provisioning of computer implemented services in a manner that is less likely to result in compromise of various infrastructure components through use of security tokens and RBAC systems.

However, when a workflow is initiated, additional workflows may need to be performed. To facilitate such related workflows (e.g., child workflows), a first worker service may spawn an additional worker service, as further discussed with respect to FIG. 2B.

Turning to FIG. 2B, a second interaction diagram in accordance with an embodiment is shown. The second interaction diagram may illustrate processes and interactions that may occur during performance of workflows to provide computer implemented services.

Now, consider an example scenario in which worker service 210 is performing a first workflow for which a second workflow may need to be performed. To do so, prior to the identification being made, worker service 210 and worker service 212 may register with workflow service 206 (as discussed generally with the worker services with respect to FIG. 2A).

To perform the original workflow, worker service 210 may perform work process 238. During work process 238, worker service 210 may retrieve and perform actions from a first queue (e.g., designated at TQ1). One of those actions may be to initiate a second workflow by another worker service (e.g., 212).

To do so, worker service 210 may, at interaction 250, send a request to start performance of a workflow to workflow service 206. However, to enable security to be validated, an intercept service (not shown) hosted by infrastructure 110 may (i) intercept the request, (ii) obtain information regarding the requestor of the workflow performed by worker service 210, (iii) request a security token from security service 204 for the new workflow using the information regarding the requestor of the original workflow, and (iv) forward the request and the security token to workflow service 206.

Once obtained by workflow service 206, similar processes and interactions (e.g., 254-260) to those (e.g., 228-236) previously discussed with respect to FIG. 2A may be performed to (i) verify authority of the requestor for the second workflow, (ii) obtain workflow tasks, and (iii) add the workflow tasks to a queue associated with worker service 212.

Consequently, when worker service 212 performs work process 262 (e.g., similar to 238, at interactions 264 and 266 the workflow tasks may be performed and confirmed back to workflow service 206. However, rather than reporting back to the interface service as discussed with respect to FIG. 2A, at interaction 268, confirmation may be provided to worker service 210. Thus, worker service 210 may be notified of the performance and/or completion of the other workflow.

And, as part of its work process 238, worker service 210 may confirm completion of its workflow tasks from its associated queue, including completion of the additional workflow (e.g., similarly to 238-244).

Thus, via the flow shown in FIG. 2B, embodiments disclosed herein may facilitate provisioning of computer implemented services via recursively initiated workflows in a manner that is less likely to result in compromise of various infrastructure components through use of security tokens, RBAC systems, and interception services.

However, to perform a workflow, the workflow may need to be authorized. To authorize the workflow, worker instances to perform the workflow may register with workflow service 206 with respect to particular queues, as further discussed with respect to FIG. 2C.

Turning to FIG. 2C, a third interaction diagram in accordance with an embodiment is shown. The third interaction diagram may illustrate processes and interactions that may occur during registration of a worker service instance.

To register worker service instance 216, startup process 270 may be performed. During startup process 270, worker service instance 216 may attempt, at interaction 272, request a token from security service 204. However, the interception service, as discussed with respect to FIG. 2B, may intercept the request and enhance the request with information regarding the worker service instance. The enhanced request may be provided to security service 204. In response, at interaction 274, presuming that the request is favorably evaluated, security service 204 may generate and provide a token to worker service instance 216. The token may include limits on the workflow tasks that may be performed by worker service instance 216.

Once obtained, worker service instance 216 may, at interaction 276, send a request and the token to workflow service 206 to register with workflow service 206. The request may specify, for example, the workflow which worker service instance 216 is desiring to perform.

Once the request and token are obtained, workflow service 206 may perform a verification process and task queueing process (e.g., 278-284) similar to that discussed with respect to FIG. 2A (e.g., similar to 228-236). Thus, presuming that the verification and queueing is successful based on the limits specified by the token and the workflow tasks to be performed, any number of workflow tasks may be added to a queue associated with worker service instance 216.

If successful, at interaction 288, workflow service 206 may send a confirmation to worker service instance 216, which may cause worker service instance 216 to perform work process 286. During work process 286, at interaction 290, worker service instance 216 may poll for and obtain various workflow tasks from the queue associated with worker service instance 216.

Thus, via the flow shown in FIG. 2C, a new worker service instance may register itself with workflow service 206 so that workflow tasks may be added to a queue polled by the new worker service instance.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage operation of endpoint devices through application of updates. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing infrastructure in accordance with an embodiment is shown. The method may be performed by any of (and/or components thereof) infrastructure management system 100, infrastructure 110, orchestrator 120, and/or other components of the system shown in FIG. 1.

At operation 300, a request to provide a new computer implemented services is obtained by an infrastructure component. The infrastructure component may host worker services and interface services. The request may be obtained by the interface services. For example, a user may provide user input or may provide other data (e.g., a file) defining the desired new computer implemented services.

At operation 302, a worker service hosted by the infrastructure component is registered with a workflow service hosted by an infrastructure management system to obtain a registered worker service. The worker service may be registered by associating a workflow for the new computer implemented service with a queue associated with the worker service. The registration may be performed securely using security tokens that limit activity of the infrastructure component.

At operation 304, a security token for the new computer implemented services is obtained by the infrastructure component and from a security service. The security token may be obtained by requesting it from a security service. The security service may verify the requestor prior to providing the security token. The security token may be signed by the service, may define various limits on activity of the infrastructure component, may authorize certain activity by the infrastructure component, and/or may include other information usable to limit and facilitate activity by the infrastructure component.

At operation 306, a workflow for the new computer implemented services may be attempted to be registered with the workflow service by the infrastructure component and using the security token. The attempt may be made by sending, by the infrastructure component and to the workflow service, a request to register the workflow and the security token; attempting, by the workflow service and using the security token, to verify that the workflow is authorized; in a first instance of the attempting to verify that the workflow is authorized where the workflow is successfully verified as being authorized: authorizing addition of the at least one task to the queue; and in a second instance of the attempting to verify that the workflow is authorized where the workflow is not successfully verified as being authorized: denying addition of the at least one task to the queue.

At operation 308, a determination regarding whether the workflow was successfully registered is made. If successfully registered in operation 306, then the method may proceed to operation 310. Otherwise, the method may proceed to operation 312.

At operation 310, at least one task based on the workflow is add, by the workflow service, to a queue associated with the registered worker service to obtain an updated queue and the at least one task is performed, by the registered worker service, using the updated queue to facilitate provisioning of the new computer implemented service. The at least one task may be performed by retrieving, performing, and confirming performance of the tasks.

The method may end following operation 310.

Returning to operation 308, the method may proceed to operation 312 if the registration is not successful.

At operation 312, addition of any asks task based on the workflow to the queue is refuse, by the workflow service, to prevent the new computer implemented services from being provided.

The method may end following operation 312.

Figure 4:
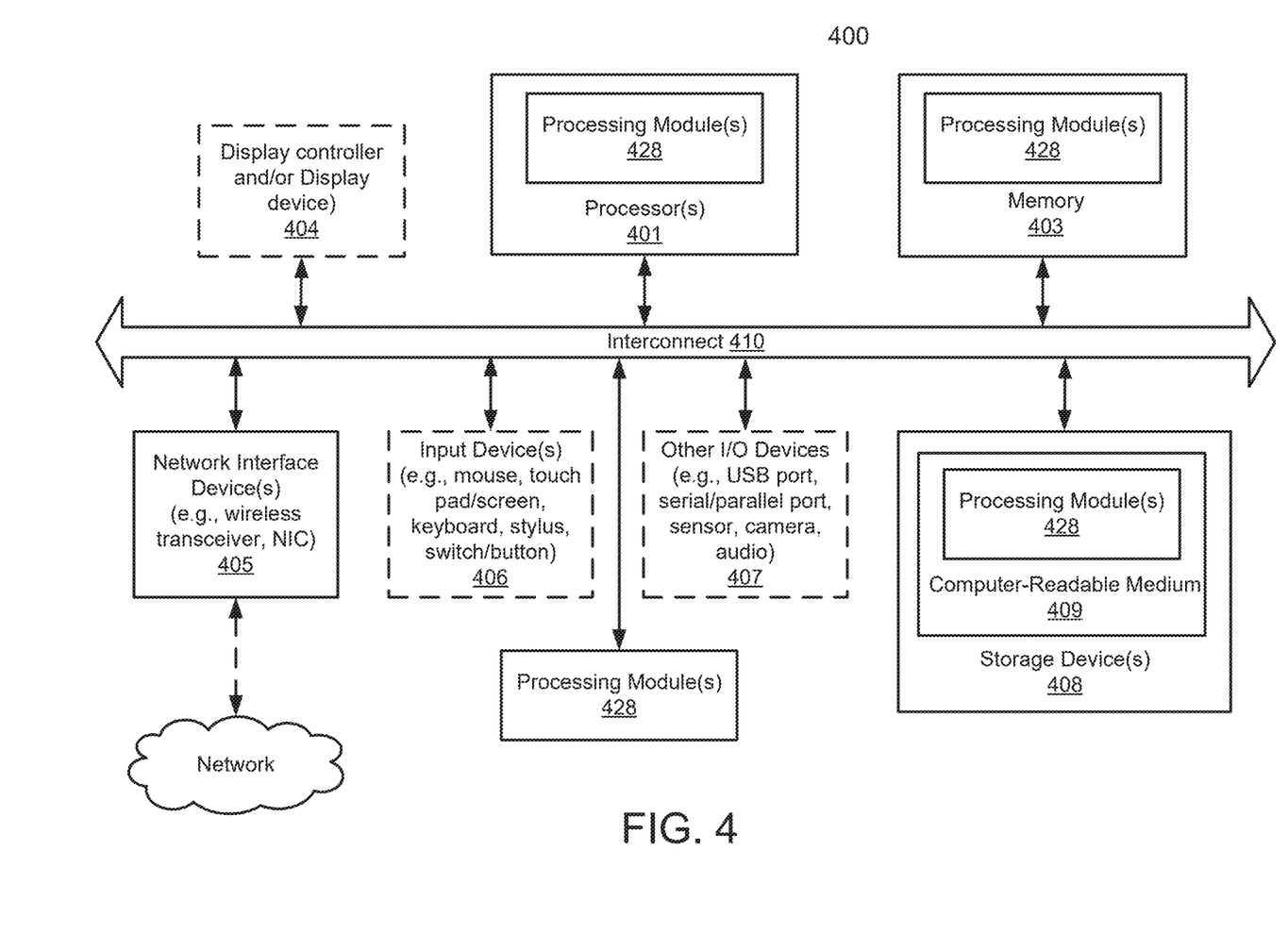
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a system that provides computer implemented services, the method comprising:
obtaining, by an infrastructure component, a request to provide a new computer implemented service;
registering a worker service hosted by the infrastructure component with a workflow service hosted by an infrastructure management system to obtain a registered worker service;
obtaining, by the infrastructure component and from a security service, a security token for the new computer implemented service;
attempting, by the infrastructure component and using the security token, to register a workflow for the new computer implemented service with the workflow service by at least:
sending, by the infrastructure component and to the workflow service, a request to register the workflow and the security token; and
verifying, by the workflow service and using the security token, whether the workflow is authorized;
in a first instance of the attempting to register the workflow where the workflow is successfully registered based on the workflow being successfully verified as being authorized by the workflow service:
adding, by the workflow service, at least one task based on the workflow to a queue associated with the registered worker service to obtain an updated queue; and
performing, by the registered worker service, the at least one task using the updated queue to facilitate provisioning of the new computer implemented service.

2. The method of claim 1, wherein registering the worker service comprises:
associating, with the workflow service, the workflow with the queue to establish an association.

3. The method of claim 2, wherein adding the at least one task comprises:
identifying, using the association, that the workflow is associated with the queue; and
selecting, based on the identifying, the queue for population with the at least one task.

4. The method of claim 1, wherein attempting to register the workflow further comprises:
in a first instance of the verifying where the workflow is successfully verified as being authorized:
authorizing addition of the at least one task to the queue; and
in a second instance of the verifying where the workflow is not successfully verified as being authorized:
denying addition of the at least one task to the queue.

5. The method of claim 1, wherein the registered worker service is adapted to monitor the queue for tasks and perform identified tasks from the queue.

6. The method of claim 1, wherein the security service provides role based access control services, and the security token is adapted based on the role based access control services.

7. The method of claim 1, further comprising:
in a second instance of the attempting to register the workflow where the workflow is not registered:
refusing, by the workflow service, addition of any asks task based on the workflow to the queue to prevent the new computer implemented services from being provided.

8. A non-transitory machine-readable medium having instructions stored therein, which when executed by a processor, cause operations to be provided, the operations comprising:
obtaining, by an infrastructure component, a request to provide a new computer implemented service;
registering a worker service hosted by the infrastructure component with a workflow service hosted by an infrastructure management system to obtain a registered worker service;
obtaining, by the infrastructure component and from a security service, a security token for the new computer implemented service;
attempting, by the infrastructure component and using the security token, to register a workflow for the new computer implemented service with the workflow service by at least:
sending, by the infrastructure component and to the workflow service, a request to register the workflow and the security token; and
verifying, by the workflow service and using the security token, whether the workflow is authorized;
in a first instance of the attempting to register the workflow where the workflow is successfully registered based on the workflow being successfully verified as being authorized by the workflow service:
adding, by the workflow service, at least one task based on the workflow to a queue associated with the registered worker service to obtain an updated queue; and
performing, by the registered worker service, the at least one task using the updated queue to facilitate provisioning of the new computer implemented service.

9. The non-transitory machine-readable medium of claim 8, wherein registering the worker service comprises:
associating, with the workflow service, the workflow with the queue to establish an association.

10. The non-transitory machine-readable medium of claim 9, wherein adding the at least one task comprises:
identifying, using the association, that the workflow is associated with the queue; and
selecting, based on the identifying, the queue for population with the at least one task.

11. The non-transitory machine-readable medium of claim 8, wherein attempting to register the workflow further comprises:
in a first instance of the verifying where the workflow is successfully verified as being authorized:
authorizing addition of the at least one task to the queue; and
in a second instance of the verifying where the workflow is not successfully verified as being authorized:
denying addition of the at least one task to the queue.

12. The non-transitory machine-readable medium of claim 8, wherein the registered worker service is adapted to monitor the queue for tasks and perform identified tasks from the queue.

13. The non-transitory machine-readable medium of claim 8, wherein the security service provides role based access control services, and the security token is adapted based on the role based access control services.

14. The non-transitory machine-readable medium of claim 8, wherein the operations further comprise:
in a second instance of the attempting to register the workflow where the workflow is not registered:
refusing, by the workflow service, addition of any asks task based on the workflow to the queue to prevent the new computer implemented services from being provided.

15. A system, comprising:
a processor; and
a memory coupled to the processor to store instructions, which when executed by the processor, cause operations to be performed, the operations comprising:
obtaining, by an infrastructure component, a request to provide a new computer implemented service;
registering a worker services hosted by the infrastructure component with a workflow service hosted by an infrastructure management system to obtain a registered worker service;
obtaining, by the infrastructure component and from a security service, a security token for the new computer implemented service;
attempting, by the infrastructure component and using the security token, to register a workflow for the new computer implemented service with the workflow service by at least:
sending, by the infrastructure component and to the workflow service, a request to register the workflow and the security token; and
verifying, by the workflow service and using the security token, whether the workflow is authorized;
in a first instance of the attempting to register the workflow where the workflow is successfully registered based on the workflow being successfully verified as being authorized by the workflow service:
adding, by the workflow service, at least one task based on the workflow to a queue associated with the registered worker service to obtain an updated queue; and
performing, by the registered worker service, the at least one task using the updated queue to facilitate provisioning of the new computer implemented service.

16. The system of claim 15, wherein registering the worker service comprises:
associating, with the workflow service, the workflow with the queue to establish an association.

17. The system of claim 16, wherein adding the at least one task comprises:
identifying, using the association, that the workflow is associated with the queue; and
selecting, based on the identifying, the queue for population with the at least one task.

18. The system of claim 15, wherein attempting to register the workflow further comprises:
in a first instance of the verifying where the workflow is successfully verified as being authorized:
authorizing addition of the at least one task to the queue; and in a second instance of the verifying where the workflow is not successfully verified as being authorized:
   denying addition of the at least one task to the queue.

19. The system of claim 15, wherein the registered worker service is adapted to monitor the queue for tasks and perform identified tasks from the queue.

20. The system of claim 15, wherein the security service provides role based access control services, and the security token is adapted based on the role based access control services.

\* \* \* \* \*